Figure 1:
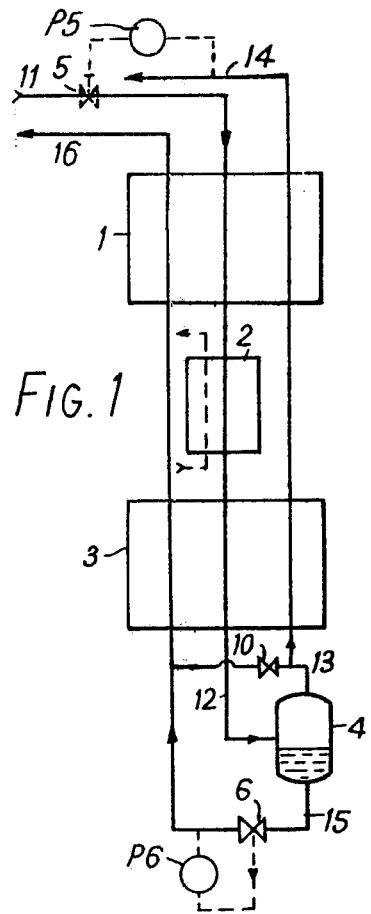

United States Patent [19]

Isalski et al.

[11] 4,255,406
[45] Mar. 10, 1981

[54] TREATMENT OF AMMONIA SYNTHESIS PURGE GAS

[75] Inventors: Wieslaw H. Isalski, Sale; Terence R. Tomlinson, Stockport, both of England

[73] Assignee: Petrocarbon Developments Limited, Manchester, England

[21] Appl. No.: 83,952

[22] Filed: Oct. 10, 1979

[30] Foreign Application Priority Data

Oct. 10, 1978 [GB] United Kingdom ............... 39880/78

[51] Int. Cl.³ .......................... B01D 51/00; C01C 1/04
[52] U.S. Cl. ........................................ 423/359; 55/23; 55/27; 55/66
[58] Field of Search ............... 423/359, 360, 361, 362, 423/363; 62/11, 23; 55/23, 27, 70, 66

[56] References Cited

U.S. PATENT DOCUMENTS

| | | | |
|---|---|---|---|
| 3,721,098 | 3/1973 | Forg et al. | 423/359 |
| 4,058,589 | 11/1977 | Haslam | 423/359 |

FOREIGN PATENT DOCUMENTS 1114407  5/1968  United Kingdom .
1274504  5/1972  United Kingdom .
1460681  1/1977  United Kingdom .

Primary Examiner—Herbert T. Carter
Assistant Examiner—Wayne A. Langel
Attorney, Agent, or Firm—Browdy and Neimark

[57] ABSTRACT

A process is disclosed for recovering hydrogen from an ammonia synthesis plant comprising (a) cooling a high pressure stream of said purge gas to a sub-ambient temperature at which substantially all of the methane and argon contained in said purge gas stream and a portion of the nitrogen condense, (b) expanding liquid and vapor components of the cooled high pressure stream to an intermediate pressure, (c) phase separating liquid and vapor components of the cooled and expanded purge gas stream, (d) expanding separated liquid component from step (c), and (e) heating expanded separated liquid component from step (d) and separated vapor component from step (c) in heat exchange with said high pressure stream of purge gas to cool the latter.

13 Claims, 4 Drawing Figures

TREATMENT OF AMMONIA SYNTHESIS PURGE GAS

This invention relates to an improvement in the treatment of ammonia synthesis purge gas.

In a widely practised process, ammonia is synthesised at superatmospheric pressure from a synthesis gas comprising hydrogen and nitrogen ideally in a ratio of 3 parts hydrogen to 1 part nitrogen by volume. However, in commercial processes, the ammonia synthesis gas also generally contains methane (about 1 mole %) introduced with the hydrogen, and argon (about 0.3 mole %) introduced with the nitrogen.

The methane and argon take no part in the ammonia synthesis and are therefore removed along with the unreacted hydrogen and nitrogen from the ammonia product which condenses out. To improve the efficiency of the process, the gas stream containing the unreacted nitrogen and hydrogen, and also containing the methane and argon impurities, is recycled to the ammonia synthesis reaction zone where it mixes with fresh nitrogen and hydrogen containing fresh amounts of these impurities, and thus these impurities tend to accumulate in the reaction zone as time proceeds, thereby lowering the partial pressure of the reacting mixture and hence reducing ammonia yield. Action therefore has to be taken to prevent the concentration of these impurities in the reactor exceeding an acceptable level.

To this end, it is general practice to withdraw continuously from the recycling gas stream a purge gas stream which is at superatmospheric pressure and which generally will have a combined content of 10 to 17% of argon and methane. The major components of this purge gas stream, which will have the same constitution as the recycling gas stream, are of course hydrogen and nitrogen of which the hydrogen is the more valuable. It is therefore desirable to recover as much as possible of this hydrogen for return to the ammonia synthesis reaction zone.

In practice, this is achieved in a hydrogen recovery plant wherein the purge gas stream is subjected to partial condensation at sub-ambient temperatures to separate a hydrogen-enriched gaseous stream, which will also contain some nitrogen, from a condensed material which will comprise most of the argon and methane and the remainder of the nitrogen and hydrogen. The gaseous hydrogen-rich stream may then be recycled to the ammonia synthesis reaction zone or otherwise used and it will be understood that since it is generally not economic to operate the process in such manner that all the argon and methane is separated out, the rate at which the purge gas stream is withdrawn from the recycling gas stream will depend inter alia on the efficiency of the separation in the hydrogen recovery plant.

Thus in current practice it is found advantageous to recover a product consisting of approximately 90% hydrogen, 9% nitrogen and about 1% of a mixture of methane and argon.

The purge gas, which is available from the synthesis plant at a high pressure, which may be 150–300 bar, is generally treated in the low temperature separation unit at pressures varying from 40 to 70 bar and the hydrogen-nitrogen product is returned at close to this pressure to an intermediate stage of the synthesis gas compressor. The actual recovery pressure may be varied according to the design of this compressor in line with the interstage pressures of the multistage machine.

At least a part of the refrigeration required in the separation unit is supplied by expanding the condensate to a low pressure, which may be 2 to 4 bar, and evaporating it in thermal contact with the high pressure purge gas. However, in current practice this refrigeration is generally inadequate and has to be supplemented by the production of some additional cold supplied by an external refrigeration cycle.

The amount of additional refrigeration required is reduced and the temperature of its supply raised by increasing the pressure at which the purge gas is admitted to the hydrogen recovery unit. Thus with an operating pressure around 50 bar it is necessary to use an external nitrogen cycle with work-expansion of the nitrogen in a turbine in a temperature range around $-70°$ C. However if the operating pressure is raised to 70 bar, it is sufficient to install an ammonia refrigeration unit with a lower capacity and an evaporating temperature around $-30°$ C.

On the other hand, operation of the recovery unit at the higher pressure of 70 bar, while advantageous for cold production, does not in every case enable the methane and argon to be removed from the purge gas to a sufficiently low level to satisfy the requirement of the synthesis plant. Thus, in present design practice, operation at 50 bar can reduce the residual argon and methane content to 1% or even slightly less, whereas operation at 70 bar will, according to current practice, leave around 1.5% of these so-called "inerts" in the hydrogen-nitrogen product.

We have now developed a process whereby the amount of refrigeration which needs to be applied in the hydrogen recovery unit of an ammonia synthesis purge gas treatment plant may be reduced and which can enable external refrigeration to be eliminated entirely. Alternatively or additionally, the temperature at which refrigeration is applied may be raised while still maintaining a satisfactorily low content of inerts in the hydrogen-nitrogen product.

According to the present invention there is provided a process for the recovery of hydrogen from purge gas from an ammonia synthesis plant which comprises:

(a) cooling a high pressure stream of said purge gas to a sub-ambient temperature at which substantially all of the methane and argon contained in said purge gas stream and a portion of the nitrogen condense, (b) expanding liquid and vapour components of the cooled high pressure stream to an intermediate pressure.

(c) phase separating liquid and vapour components of the cooled and expanded purge gas stream, (d) expanding separated liquid component from step (c), and (e) heating expanded separated liquid component from step (d) and separated vapour component from step (c) in heat exchange with said high pressure stream of purge gas to cool the latter.

The invention further provides a method of synthesing ammonia by reacting a synthesis gas comprising nitrogen and hydrogen at superatmospheric pressure in a reaction zone with recycling of unreacting gas to the reaction zone and wherein a purge gas stream is withdrawn at superatmospheric pressure from the gas being recycled, is subjected to a recovery process comprising steps (a) to (e) above and at least a portion of said separated vapour component is recycled to the reaction zone.

Preferably the high pressure stream of purge gas is at a pressure of at least 70 bar.

The expansion of the liquid and vapour components may be carried out directly ion the liquid-vapour mixture formed in step (a), for example in a single valve, or alternatively the liquid vapour mixture may be fed to a preliminary separator from which the liquid and vapour are withdrawn and expanded separately, for example through separate valves before being subjected to phase separation step (c).

In the latter case, the separately expanded streams are preferably recombined in or prior to the separator in which phase separation step (c) is carried to enable a degree of equilibration of the separated phases to occur. To promote such equilibration, the separately expanded gaseous stream is preferably admitted to the separator in which phase separation step (c) is carried out below the level of liquid therein. Similarly the separately expanded liquid stream is preferably admitted above said level.

Preferably in carrying out the process of the invention, ammonia purge gas at a pressure equal to or greater than 70 bar is fed to a hydrogen recovery unit and is cooled by counter-current heat exchange with hydrogen-nitrogen product and with evaporating condensate to a temperature at which almost all of the methane and argon and a part of the nitrogen condense; the resulting liquid-vapour mixture is expanded to an intermediate pressure which is preferably 20 to 40 bar lower than the feed pressure; the expanded mixture is fed to a separator at said intermediate pressure; a gaseous hydrogen-nitrogen mixture, preferably containing about 1% or less of methane and argon, and a condensate mixture comprising methane, argon and some nitrogen are recovered; the hydrogen-nitrogen mixture is returned in heat-exchange with the high pressure purge gas; the condensate is expanded to a low pressure, preferably 2 to 4 bar; and the expanded condensate is evaporated and warmed in heat exchange with the high pressure purge gas.

Figure 2:
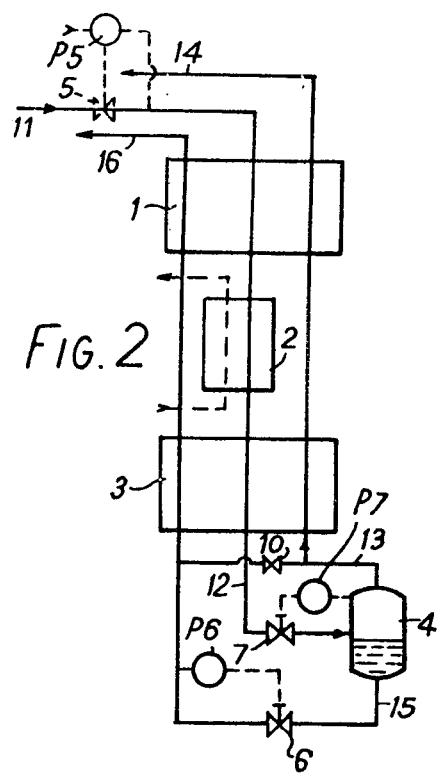
Figure 3:
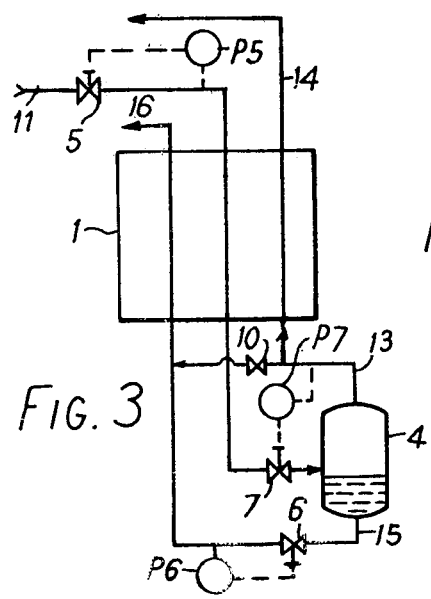
Figure 4:
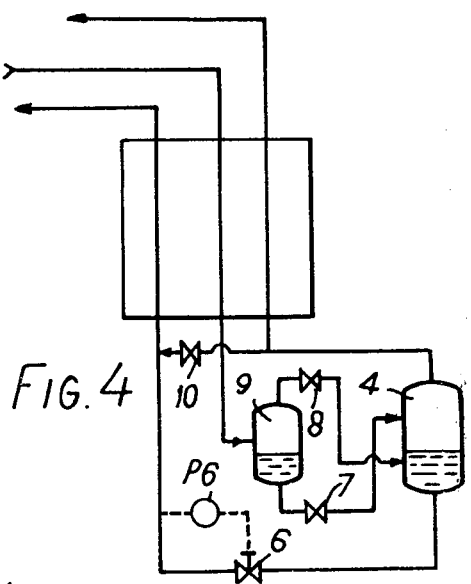

The invention will now be described in more detail by way of example with particular reference to the accompanying drawings of which FIG. 1 is a simplified flow diagram of a conventional ammonia synthesis purge gas separation plant and FIGS. 2 to 4 illustrate modes of operation according to the invention.

Referring to FIG. 1 which illustrates a conventional process, numerals 1, 2, and 3 denote heat exchangers, 4 is a liquid-vapour separator and 5, 6 and 10 are expansion valves. Purge gas at 150 bar enters the hydrogen recovery unit through line 11, is expanded to 50 bar in expansion valve 5 controlled by pressure controller P5, is cooled in heat exchanger 1 with returning hydrogen-nitrogen product and evaporating condensate, further cooled to −70° C. in exchanger 2 with a nitrogen cycle (not shown), and finally cooled to −180° C. in exchanger 3 with hydrogen-nitrogen product and evaporating condensate. The resulting liquid-vapour mixture leaves exchanger 3 through line 12 and passes to separator 4. A gas consisting of hydrogen and nitrogen and containing 1% of a mixture of methane and argon leaves the separator through line 13, is warmed in exchangers 3 and 1 and leaves as product through line 14. Condensate, consisting of methane, argon, nitrogen and a small amount of dissolved hydrogen, leaves the separator 4 through line 15, is expanded to 3 bar in the expansion valve 6, controlled by pressure controller P6, then is evaporated in exchanger 3 and warmed in exchanger 1, finally leaving through line 16.

In order to lower the temperature range in which the condensate evaporates, a small stream of hydrogen is expanded through valve 10 and injected into the condensate.

Referring now to FIG. 2, in which like numerals are used where appropriate, the purge gas at 150 bar enters through line 11 and is expanded to 70 bar in valve 5. It is cooled in exchanger 1 with returning product and evaporated condensate and further cooled in exchanger 2 to 33° C. with evaporating liquid ammonia. It is then cooled to −180° C. in exchanger 3, and expanded to an intermediate pressure of 48 bar in expansion valve 7, controlled by pressure controller P7. At this pressure it enters separator 4, where it is separated into a vapour containing 1% of a mixture of methane and argon, which is warmed in exchangers 3 and 1, leaving through line 14, and a condensate, which is withdrawn through line 15, expanded to 2 bar in valve 6, warmed and evaporated in exchangers 3 and 1 and withdrawn through line 16. To ensure equilibrium downstream of valve 7, a suitable mixing device may be inserted in the pipeline.

In FIG. 3 the purge gas, which again enters at 150 bar, is expanded in valve 5 to 90 bar. It is then cooled in a single heat exchanger to about −180° C. and further expanded to an intermediate pressure of 50 bar in valve 7, controlled by pressure controller P7. At this pressure it enters separator 4, where it is separated into a vapour containing 1% of methane and argon and a condensate. The vapour is removed through line 13 and warmed in exchanger 1, and the condensate is withdrawn through line 15, expanded to 2 bar in valve 6 and warmed in exchanger 1, leaving through line 16. No additional refrigeration, whether by way of a nitrogen cycle or with evaporating liquid ammonia, is necessary for efficient operation of the plant.

In the process illustrated in FIG. 4 (which otherwise operates in a similar manner to that illustrated in FIG. 3) the high pressure stream, after cooling in heat exchanger 1, but still at a pressure of about 90 bar is subjected to a preliminary phase separation in separator 9. The separated liquid and vapour components are then expanded separately through valves 7 and 8 to the same intermediate pressure and fed to a further phase separator 4. A particular advantage of passing liquid and vapour through the separate valves 7 and 8 is that two-phase flow in a single valve is avoided, thus reducing the likelihood of instability and control difficulties. The liquid and vapour components are then introduced into phase separator 4 respectively above and below the level of liquid therein thus ensuring that the separated liquid and vapour are at least partially equilibrated at the intermediate pressure. Thereafter operation is as in FIG. 3.

The introduction of the intermediate expansion valve(s), permitting the purge gas to be cooled at one pressure and separation to take place at another lower pressure, results in an increased flexibility of the process, e.g. allowing the external refrigeration to be reduced or eliminated, its temperature to be raised where it is still required, with a corresponding reduction in power consumption, and/or the inerts content of the hydrogen-nitrogen product to be adjusted to satisfy the requirements of the ammonia synthesis plant.

This flexibility is demonstrated in the following Table, in which P1 denotes the pressure at which the purge gas is cooled, P2 the pressure in the final separator, x the inerts content of the hydrogen-nitrogen product, T the temperature at which, if at all, refrigeration is required, and Q the amount of refrigeration needed by a hydrogen recovery unit associated with a 1,000 ton/day ammonia synthesis plant. In every case the tail gas (evaporated condensate) is assumed to leave the hydrogen recovery unit at 3 bar abs.

TABLE

| Example | P1 bar | P2 bar | x M % | T °C. | Q Kcal/hr. |
|---|---|---|---|---|---|
| A | 50 | 50 | 1.0 | −70 | 10,000 |
| B | 70 | 70 | 1.4 | −30 | 4,000 |
| C | 70 | 50 | 1.0 | −33 | 5,000 |
| D | 90 | 50 | 1.0 | — | 0 |

It will be seen that, in comparison with Example A, the procedure of Example B, which also does not utilise the present invention, while reducing the amount of refrigeration needed and raising the temperature at which it is required, delivers a product of lower purity. But the procedure of Example C, while still halving the refrigeration needed in Example A and raising the refrigeration supply temperature from −70° to −33° C., maintains the inerts content of the product at 1%. In Example D, which also makes use of the invention, raising the entry pressure P1 to 90 bar enables external refrigeration to be eliminated entirely, while still maintaining the desired product purity.

We claim:

1. A process for the recovery of hydrogen from purge gas comprising hydrogen and nitrogen and impurities including methane and argon from an ammonia synthesis plant which comprises:
   (a) cooling a high pressure stream of said purge gas to a sub-ambient temperature at which substantially all of the methane and argon contained in said purge gas stream and a portion of the nitrogen condense,
   (b) expanding liquid and vapour components of the cooled high pressure stream to an intermediate pressure,
   (c) phase separating liquid and vapour components of the cooled and expanded purge gas stream,
   (d) expanding separated liquid component from step (c), and
   (e) heating expanded separated liquid component from step (d) and separated vapour component from step (c) in heat exchange with said high pressure stream of purge gas to cool the latter.

2. A process according to claim 1 wherein the high pressure stream of purge gas is at a pressure of at least 70 bar.

3. A process according to claim 1 wherein the expansion of the liquid and vapour components is carried out directly on the liquid-vapour mixture formed in step (a).

4. A process according to claim 1 wherein prior to the expansion of the liquid and vapour components, liquid/vapour mixture formed in step (a) is fed to a preliminary separator from which liquid and vapour are withdrawn and expanded separately to said intermediate pressure before being subjected to phase separation step (c).

5. A process according to claim 4 wherein the separately expanded streams are recombined in or prior to the separator in which phase separation step (c) is carried out to enable a degree of equilibration of the separated phases to occur.

6. A process according to claim 5 wherein the separately expanded gaseous stream is admitted to the separator in which phase separation step (c) is carried out below the level of liquid therein.

7. A process according to claim 6 wherein the separately expanded liquid stream is admitted above said level.

8. A process according to claim 1 and comprising the steps of (1) feeding ammonia purge gas at a pressure equal to or greater than 70 bar at a hydrogen recovery unit where it is cooled by counter-current heat exchange with hydrogen-nitrogen product and with evaporating condensate to a temperature at which almost all of the methane and argon and a part of the nitrogen condenses; (2) expanding the resulting liquid-vapour mixture to an intermediate pressure; (3) feeding the expanded mixture from step (2) to a separator at said intermediate pressure; (4) recovering a gaseous hydrogen-nitrogen mixture and a condensate mixture comprising methane, argon and some nitrogen; (5) returning the hydrogen-nitrogen mixture in heat-exchange with the high pressure purge gas; (6) expanding the condensate to a low pressure; and (7) evaporating and warming the expanded condensate in heat exchange with the high pressure purge gas.

9. A process according to claim 8 wherein the hydrogen-nitrogen mixture recovered in step (4) contains about 1% or less of methane and argon.

10. A process according to claim 8 wherein in step (6) the condensate is expanded to a pressure of from 2 to 4 bars.

11. A process according to any preceding claim in which the liquid and vapour components of the cooled high pressure stream are expanded to an intermediate pressure which is from 20 to 40 bar lower than the pressure of the high pressure stream.

12. A method of synthesising ammonia, by reacting a synthesis gas comprising nitrogen and hydrogen at superatmospheric pressure in a reaction zone with recycling of reacting gas to the reaction zone and wherein a purge gas stream is withdrawn at superatmospheric pressure from the gas being recycled, is subjected to a recovery process as claimed in any one of claims 1 to 10 and at least a portion of the separated vapour component is recycled to the reaction zone.

13. A method according to claim 12 wherein the liquid and vapour components of the cooled high pressure stream are expanded to an intermediate pressure which is from 20 to 40 bar lower than the pressure of the high pressure stream.

* * * * *